April 20, 1954 J. ENSINK ET AL 2,676,304
WAVE MODULATOR TO PRODUCE A SINGLE SIDEBAND SIGNAL
Filed Dec. 11, 1951
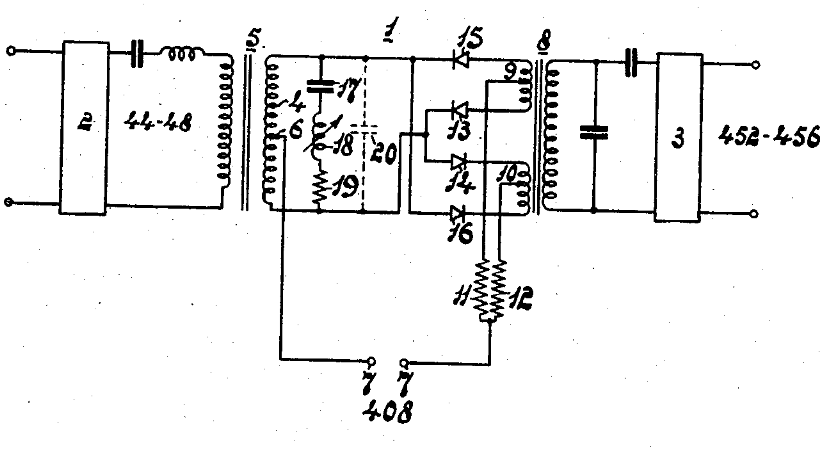
INVENTOR
Johannes Ensink
Jacob Willem Scholten
By [signature]
Agent Patented Apr. 20, 1954

2,676,304

UNITED STATES PATENT OFFICE 2,676,304

WAVE MODULATOR TO PRODUCE A SINGLE SIDEBAND SIGNAL

Johannes Ensink and Jacob Willem Scholten, Hilversum, Netherlands, assignors to Hartford National Bank and Trust Company, Hartford, Conn., as trustee Application December 11, 1951, Serial No. 261,098

Claims priority, application Netherlands January 11, 1951

3 Claims. (Cl. 332—45)

The invention relates to a circuit arrangement for deriving from a carrier-wave modulated by an intelligence signal a single sideband. In known arrangements of this type, the signal is supplied through a first bandpass filter, which only passes signal frequencies, to the input circuit of a modulator. A carrier wave is supplied to the modulator and is modulated by the signal so that the output circuit of the modulator yields a modulated carrier-wave having upper and lower sidebands. A second bandpass filter passing only frequencies falling within the desired single sideband is coupled to the output circuit to transmit the desired band and prevent transmission of the undesired band.

Such modulator circuits are used frequently in carrier wave telephone systems.

These circuits have a serious disadvantage in that the unwanted sideband, reflected by the output filter, passes through the modulator in opposite sense, thus forming modulation products which cannot pass through the input filter and are, consequently, reflected there and again pass through the modulator in the initial direction.

Thus modulation products are formed. Some of the frequencies of these products lie within the pass band of the output filter and are thus transmitted further, which harmfully affects the transmission.

In the first place the non-ideal properties of such modulator becomes more manifest in the stability and in the divergence from the behavior of similarly built modulators, and secondly, the finite, strongly variable value of the impedances of the filter is found to affect greatly the frequency characteristic.

The invention has for its object to provide a reduction of these linear distortions produced by reflections at the input and output filters.

The circuit according to the invention has the feature that the modulator comprises a network which constitutes a virtual load for one or more of those sidebands which after at least one reflection at each of the filters, would produce a signal lying within the wanted sideband and occurring across the output circuit.

Consequently in the circuit according to the invention, the transmission path for the sideband concerned is cut off in the correct manner and this sideband is dissipated in the load impedance.

For the sake of completeness it should be noted that modulator circuit-arrangements are known in which the modulator comprises a network.

In one of these circuit-arrangements this network serves to compensate the natural capacity of the rectifiers of the modulator and together with this capacity, this network constitutes a resonant circuit, which is tuned to a desired frequency occurring across the output circuit.

A further known circuit-arrangement comprises a network in the modulator with a view to adapt the modulator and a bandpass filter comprised in the output circuit.

In this known circuit-arrangement there is no recognition of the fact that unwanted modulation products can be suppressed by a network in the modulator, which is used to sift out particular sidebands.

In order that the invention may be more clearly understood and readily carried into effect, it will now be described more fully with reference to the accompanying drawing.

The input circuit of the modulator 1 comprises a bandpass filter 2 and the output circuit comprises a bandpass filter 3.

The modulator 1 is of known type, with the exception of the network to be described hereinafter and is constructed in the form of a double push-pull modulator.

The secondary winding 4 of the input transformer 5 has a center tap 6, which is connected to one of the terminals 7 of the carrier-wave supply source.

The primary winding of the output transformer 8 is divided into two parts 9 and 10. The center taps of these parts are connected through resistors 11 and 12 respectively to the other terminal 7 of the carrier-wave supply source.

The secondary winding of the transformer 8 is tuned with the use of a capacitor and forms part of the filter 3.

The lower side of the secondary winding 4 of the transformer 6 is connected through a rectifier 13 to the lower side of the winding 9 and through a rectifier 14, having opposite polarity, to the upper side of the winding 10.

The upper side of winding 4 is connected through a rectifier 15 of the same polarity as the rectifier 13 to the upper side of winding 9 and through a rectifier 16, having opposite polarity, to the lower side of winding 10.

By way of example, it will be assumed that the bandpass filter 2 has a pass band of 44 to 48 kcs. and the filter 3 a pass band of 452 to 456 kcs., a carrier-wave frequency of 408 kcs. being supplied to the terminals 7.

If a signal is supplied to the input circuit in the range of from 44 to 48 kcs., a number of modulation products is produced, at a carrier-wave frequency of 408 kcs., the principal products being constituted by the upper sideband of the carrier-wave lying between 452 to 456 kcs., and the lower sideband of 360 to 364 kcs., and the two sidebands of the third harmonic of the carrier-wave from 1176 to 1180 kcs., and from 1268 to 1272 kcs.

The first-mentioned sideband is the wanted sideband and is allowed to pass through the bandpass filter 3, whereas the other sidebands, the undesired sidebands, are reflected.

After these undesired sidebands have passed through the modulator in the reverse direction, some of the modulation products thus produced are reflected at the bandpass filter 2, upon which they pass through the modulator in the initial direction.

One or more of the modulation products thus produced now lie within the pass band of from 452 to 456 kcs., of the bandpass filter 3.

In order to suppress one or more of these modulation products, the modulator comprises a network, which comprises in this case the series combination of the capacitor 17, inductor 18 and resistor 19.

The rectifiers and the coupling elements mostly exhibit parasitic capacity, which is designated by 20. This capacity 20 is included in the network, with a view to which the tuning of the capacitor 17 and the coil 18 are altered accordingly.

The network behaves as a half filter section comprising the input capacity 20, if any, the resonant circuit 17, 18 located in the longitudinal branch and the resistor 19, included in the transverse branch.

If desired, a capacitor may be connected in parallel with the resistor 19, so that a complete filter section is formed.

The frequencies of the sideband to which the resonant circuit is tuned are dissipated in the resistor 19.

To further visualize the tuning of this series resonant circuit, it is easier to consider the bandpass filter 3 as the input bandpass filter and the bandpass filter 2 as the output bandpass filter, which is allowable because of the reversibility of modulator operation.

If a signal is supplied to the bandpass filter 3, which lies in the range of from 452 to 456 kcs., two sidebands occur, i. e. from 44 to 48 kcs., and from 860 to 864 kcs., if modulation products of higher order are left out of consideration.

The first-mentioned sideband is allowed to pass through the bandpass filter 2, but the second is reflected and constitutes the origin of those modulation products which finally produce, in conjunction with the next following reflection at the bandpass filter 3, sidebands which lie within the pass band of the bandpass filter 2.

Consequently, the series circuit 17, 18 must be tuned if the capacity 20 is left out of consideration, to a frequency lying within the range of from 860 to 864 kcs.

If the modulator circuit is now viewed in the initial direction, a signal of from 44 to 48 kcs., is supplied, so that the first order sidebands extend from 452 to 456 kcs., and from 160 to 164 kcs. The latter sideband is reflected by the bandpass filter 3 and supplies in the reverse direction as first order products the sidebands of from 44 to 48 kcs., and from 768 to 772 kcs.

The first-mentioned sideband is allowed to pass through the bandpass filter 2 and the second is reflected, but in the initial direction it does not supply first-order modulation products lying within the pass band of the bandpass filter 3.

If the reflected sideband of from 360 to 364 kcs., is once more taken as a basis and if modulation products of high order are also taken into consideration, this reflected sideband is found to produce in the reverse direction a sideband of from 860 to 864 kcs., in conjunction with the third harmonic of the carrier-wave, i. e. with the frequency of 1224 kcs., this sideband being reflected by the bandpass filter 2 and producing in the initial direction a first-order modulation product of from 452 to 456 kcs., in conjunction with the carrier-wave, this product falling within the range of the filter 3.

If, as has been set out above, the sideband of from 860 to 864 kcs., is consequently absorbed by the network, this source of interference has been eliminated.

What we claim is:

1. A circuit arrangement for deriving from a carrier-wave modulated by an intelligence signal having a predetermined frequency range a singe sideband, said arrangement comprising a double push-pull diode modulator provided with input and output circuits, a first bandpass filter having a frequency response in which all frequencies falling within said predetermined range are passed and all other frequencies are reflected, means to supply said intelligence signal to said input circuit through said first filter, means to apply said carrier-wave to said modulator to combine with said intelligence signal to produce in said output circuit a modulated carrier-wave having upper and lower sidebands, a second bandpass filter having a frequency response in which all frequencies falling within the frequency range of one of said sidebands are passed and all other frequencies are reflected, and means coupled to said output circuit through said second filter to derive said single band, said modulator further including a resonant network connected across said input circuit and tuned to a selected frequency band for dissipating wave energy which has been reflected at least one by each filter.

2. A circuit arrangement, as set forth in claim 1, in which said network is a series resonant network.

3. A circuit arrangement, as set forth in claim 2, wherein said modulator input circuit includes a parasitic reactance and wherein said tuned network includes in series connection a capacitance and an inductance, said series connection being shunted by said parasitic reactance.

References Cited in the file of this patent

UNITED STATES PATENTS

| Number | Name | Date |
|---|---|---|
| 2,167,722 | Lindenblad | Aug. 1, 1939 |
| 2,214,041 | Brown | Sept. 10, 1940 |
| 2,455,732 | Carter | Dec. 7, 1948 |
| 2,456,494 | Ensink | Dec. 14, 1948 |

FOREIGN PATENTS

| Number | Country | Date |
|---|---|---|
| 478,994 | Great Britain | Jan. 28, 1938 |